United States Patent
Patel et al.

(10) Patent No.: US 8,938,501 B2
(45) Date of Patent: Jan. 20, 2015

(54) METHOD AND SYSTEM OF GENERATING CONSUMER DATA BY FACILITATING THE COMMUNICATION OF FEEDBACK IN A GROUP SETTING

(76) Inventors: Parag Patel, Calabasas, CA (US);
Suresh Warrier, Manhattan Beach, CA (US); Malik Magdon-Ismail, Loudonville, NY (US)

( * ) Notice: Subject to any disclaimer, the term of this patent is extended or adjusted under 35 U.S.C. 154(b) by 147 days.

(21) Appl. No.: 13/556,114

(22) Filed: Jul. 23, 2012

(65) Prior Publication Data
US 2013/0031175 A1    Jan. 31, 2013

Related U.S. Application Data

(60) Provisional application No. 61/513,291, filed on Jul. 29, 2011.

(51) Int. Cl.
G06F 15/16     (2006.01)
G06Q 10/10    (2012.01)
G06Q 30/02    (2012.01)

(52) U.S. Cl.
CPC ............ *G06Q 10/10* (2013.01); *G06Q 30/0201* (2013.01)
USPC ............................. 709/204; 709/203; 709/205

(58) Field of Classification Search
None
See application file for complete search history.

(56) References Cited

U.S. PATENT DOCUMENTS

| | | | |
|---|---|---|---|
| 5,615,134 A * | 3/1997 | Newsham et al. ............ 700/276 |
| 2005/0273804 A1* | 12/2005 | Preisman ........................ 725/24 |
| 2007/0208802 A1* | 9/2007 | Barman et al. ................ 709/203 |
| 2008/0010351 A1* | 1/2008 | Wardhaugh et al. .......... 709/206 |
| 2008/0082394 A1* | 4/2008 | Floyd et al. ..................... 705/10 |
| 2009/0063252 A1* | 3/2009 | Abhyanker ...................... 705/10 |
| 2011/0289431 A1* | 11/2011 | Olumoko et al. ............. 715/753 |
| 2012/0066071 A1* | 3/2012 | Thomas et al. ............ 705/14.66 |
| 2012/0246580 A1* | 9/2012 | Bouverat ...................... 715/753 |
| 2012/0265635 A1* | 10/2012 | Forsblom .................... 705/26.7 |
| 2014/0019209 A1* | 1/2014 | Cole ............................ 705/7.32 |

OTHER PUBLICATIONS

CNN, How does CNN make election projections?, http://www.cnn.com/2008/POLITICS/10/13/projection.explainer, Oct. 13, 2008.*

* cited by examiner

*Primary Examiner* — Umar Cheema

(57) ABSTRACT

A method of generating consumer data by facilitating the communication of feedback in a group setting over a global data communications network is shown. After creating or joining a group, members of the group may send or receive polls, consisting of photos, videos, group texts and event messages to other group members and/or the poll creators' social networks. Other group members and social network friends are notified instantly or almost instantly and respond back promptly. The results are organized and presented in an engaging visual manner and the consumer data collected from such interactions are stored in a database.

16 Claims, 5 Drawing Sheets

US 8,938,501 B2

METHOD AND SYSTEM OF GENERATING CONSUMER DATA BY FACILITATING THE COMMUNICATION OF FEEDBACK IN A GROUP SETTING

I. CROSS-REFERENCE TO RELATED APPLICATION

This Application claims priority to U.S. Provisional Patent Application 61/513,291 filed on Jul. 29, 2011 and entitled Method And System Of Obtaining Feedback In A Group Setting. The entire disclosure of this priority application is hereby incorporated by reference herein.

II. STATEMENT RE: FEDERALLY SPONSORED RESEARCH/DEVELOPMENT

Not Applicable

III. BACKGROUND

The present invention generally relates to social networking and communications. Worldwide use of the Internet, mobile, instant and delayed communication technology and social networks are growing at an extremely rapid pace. Millions of people worldwide use the Internet through social networking sites and mobile applications daily for accessing information, shopping, recreation, receiving product updates, and other communications. As mobile and Internet data access become less expensive, global and easier to use, use of the Internet and mobile communication apps will become even more widespread.

Several communication mobile applications already exist, but none focus on the main elements of the instant invention, namely, obtaining almost instant feedback on virtually anything with minimal number of clicks and the ability to obtain data (e.g. the object on which feedback is being provided, surveys conducted in an engaging manner, geo-location of the users providing the feedback, demographic data on the users, and other typically collected forms of data in the internet and mobile area) from a close group of user-selected friends, a larger group or the general public in a manner that entertains and provides a valuable service to the users.

Event data (e.g. data related to users intending to watch a favorite sports team playing another team, television shows, movies (especially new releases), theater, opera or other special mass scheduled events) that are created by users using the invention provide additional valuable data as to the viability of products or services and/or present relevant advertising, marketing opportunities and valuable insight into forecasting for supply chains, markets and the like.

In addition to the above, allowing users to obtain feedback easily and almost instantly on images (a pair of shoes sold on an online retail store), website links (news stores, blogs, etc.) or other content (e.g. video clips, music, games, etc.) available on the Internet or other online sources (e.g. online web applications like iTunes) helps the user in making decisions and being entertained and provides the website or content owner with a new source of potential customers (the user and the recipients of the user's poll who, in the example of the shoes above, may view the image of the shoes and be given a link to the webpage) and valuable market research (e.g. how the poll was answered by users, responses broken down into demographical, geographical and other type of audience segments, the current purchasing desires of the users).

IV. BRIEF DESCRIPTION OF THE DRAWINGS

The invention is herein described, by way of example only, with reference to the following drawings wherein.

V. DESCRIPTION OF THE INVENTION AND PREFERRED EMBODIMENTS

Figure 1:
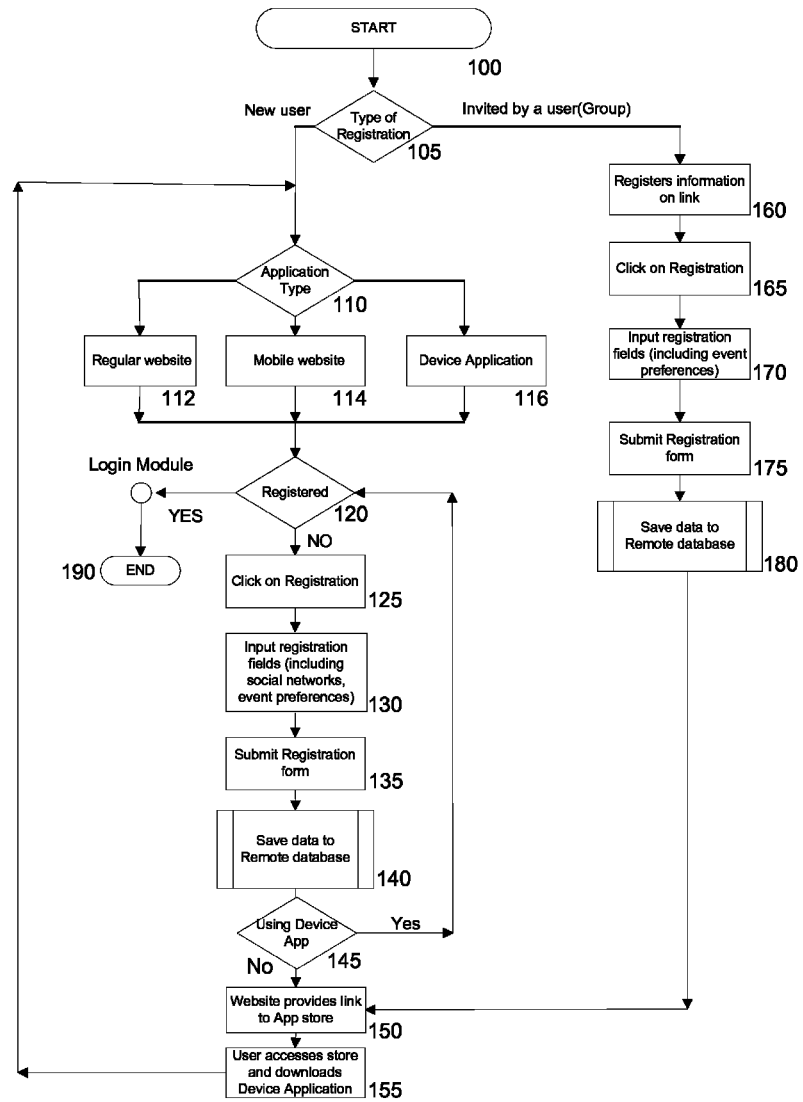
FIG. 1 shows a flowchart which provides a method for registering users who wish to access the Service.

A method of generating consumer data by facilitating the communication of feedback in a group setting over a global data communications network is shown, the method comprising the steps of: enabling at least one initial user to register using a device connected to said global data communications network; enabling said initial user to use said device to invite other users to create a group of users, comprising of initial user and invited users; enabling at least one of said invited other users to register as a group user using a device connected to said global data communications network; enabling at least one of said group of users to create a poll using said group user's device connected to said global data communications network; enabling said group user to send said poll to said group of users by using said group user's device; collecting at least one response to said poll from one or more users in said group; and generating predictive analytical results from one or more responses. Additional steps, such as using an instant notification method (e.g. push notification, SMS messaging, instant alerts), sending the same poll to multiple different groups of friends or to one or more of the poll creator's social networks or sending out a survey (in the form of a series of polls) are also provided. FIGS. 1 through 5 show an embodiment of the invention.

While not intended as a limitation, it is contemplated that the invention will partially comprise of a Service provided through an application or number of applications that are executable on various current (e.g. iPhone iOS, Android, Blackberry, Windows phone, Symbian) and future mobile platforms, social networks (e.g. Facebook, Google+, Twitter, Pinterest), laptop or desktop computer devices (web applications, browser applications, browser extensions or standalone applications for PC or Mac) and mobile web applications (for unsupported mobile devices or supported mobile devices not running the applicable mobile application). Hence the goal is to make the Service function on as many devices as possible (i.e. application platform independent) and available to any person with any device that has a connection now or in the future to a global data communications network. This network may be of the type provided currently by mobile phone carrier providers and internet service providers around the world (e.g. AT&T, Verizon, Orange, Reliance, China Mobile, cable companies, satellite companies etc.). While the nature of the network and the providers may change in the future, the scope of the invention is intended to cover all current and future types of data networks.

As part of the Service, users will typically be asked to join a friend's group or register and create a group. Once one of more invited users accept, thereby forming a group, any member of such group may send or receive one or more polls. A poll may include photos, videos, group texts and event messages. The following example is not intended as a limitation on the type of poll or number or groups or types of groups to which a poll may be sent: a poll, may include, where to eat, what music to listen to, where to travel or whether a date a potential suitor. The recipients group may include one or more distinct groups created by the poll creator, social networks, followers on other networks, followers of the poll creator, all members using the Service, the entire world, members of a certain demographic or all or some of these aforementioned groups combined.

As a typical example how a poll creator may use the Service (a typical photo or video poll), a group member may see an object that she may want to purchase (e.g. a red dress) but desires to obtain her "best friends" group's collective feedback before making the purchase. She would launch the app, take a photo of the dress (or photos or videos of several dresses), select an appropriate question ("Which one should I buy or not"), add a optional group message and send out the poll. If the poll creator so desires, she could also send the poll to her friends or followers on a social network (e.g. Facebook, Twitter, Google+). Depending on the alert settings of her "best friends" group and those in her social networks, some or all of her friends are notified instantly or almost instantly and respond back promptly. The results are organized in an engaging visual manner that one or more of the group members and/or social network friends would also be permitted to see based on the poll creator's preferences or the Service's defaults.

In a preferred embodiment, a user would be able to create a poll, based not only on media (e.g. photo or video) taken by the user, but on online content (Online Content) browsed by the user, for example images (e.g. a pair of shoes sold on an online retail store), website links (news stores, blogs, etc.) or other content (e.g. video clips, music, games, etc.) available on the Internet or other online sources (e.g. online web applications like iTunes). For example, a user, seeing an image of a pair of red shoes on an online store, is enabled to show such image and the link of the webpage of the online store, as part of her poll to her friends on whether or not to purchase the shoes. The poll results helps the user in making decisions (it also entertains the user and users' group(s) of friends) and provides the online retail store, in this example, with a new source of potential customers (the user and the recipients of the user's poll) and valuable market research (e.g. how the poll was answered by users, responses broken down into demographical, geographical and other type of audience segments, the current purchasing desires of the users). The above example is not intended to limit the application only to online retail purchases; as indicated above, Online Content (indeed every website or web application intended for public viewing) would benefit from increased traffic and market research.

In a preferred embodiment, a poll creator may allow his or her poll to be shared and re-shared by the recipients with the recipients' groups and/or social network friends and followers, thereby getting even more responders to view and respond to the poll creator's initial poll. In yet another preferred embodiment, a poll creator may, in lieu of or in additional to sending a poll to such user's groups or social network friends, make the poll public to any other user that is interested in following the poll creator, thereby allowing even more responders to respond to the poll. Naturally, the poll creator could also follow and/or respond to the polls of other users of the Service. Poll results may be aggregated or separated by groups (if more than one group of friends is chosen), social networks, followers of the user or by other filter types selected by the user.

In a preferred embodiment, a poll may include an event message. An event message includes any public-scheduled event, for example sports events, movies openings and schedules, arts and music performances, school events, television shows, company events, product launches (e.g. the latest version of a mobile phone), book premiers, signings and the like, that a user has configured on his or her account (which may be accessible through one or more of the user's devices) to receive either manually or automatically (e.g. via download from one or more central servers containing and receiving updated relevant event information). For well-known public events, the user may receive reminders of upcoming events (e.g. a Los Angeles Lakers fan may be sent reminders of an upcoming Lakers game; likewise a movie fan may receive reminders for the opening night of a movie containing a favorite actor, movie type (action, drama, romance), director or genre or other variable important to such user). Typically after receiving an event message (e.g. reminder of an upcoming Lakers game), a user, in the present example, a Lakers fan who has created a Lakers group, may access the service via the application on the user's device, see additional details for the upcoming Lakers game, select it and send a ping to his Lakers group with a question (e.g. See the game at my place or not). He may add an optional group message and then send the Ping to his Lakers group. The remaining members of the group would receive a form of instant communication (e.g. push notification, text message, email etc.), review the question and respond appropriately, all with a minimal number of clicks. Similar obvious scenarios are applicable in other event categories (e.g. asking a group to view a movie during opening weekend, attend a book signing by a famous author or view a popular television show at a member's house).

In a second preferred embodiment, the group members would also be able to further engage in a group dialogue, if desirable, regardless of sending a photo, video or event poll. In another preferred embodiment, the creator of the poll would be able to send a poll to one or more of his or her groups simultaneously and configure the results to be viewable and the ensuing group discussion to be accessible throughout all members of all groups, only within members of each group or to only certain selected members within a group or across the one or more groups.

The data collected by the service based on such poll communications would be valuable and provide insight into product and service offerings. Users may also be invited or be asked (if they wish to receive further benefits for the application, for example or for other consideration) to participate in various surveys. Such surveys may take a similar form to polls—for example, a user may be presented with several photos and be asked during the sequence to respond to a question relating to each photograph or series of photographs. Likewise a user may be presented with a mix of photos, videos, event information or just plain text questions and be asked to respond to such questions, either individually, collectively or somewhere in between. These types of survey may benefit any entity that sells services or products (e.g. a retailer who may desire to receive market information of types of garments that users across various demographics and geo-locations find attractive (or not) and the amount of money such users would typically agree to pay for such garment). For event coordinators, the buzz created before an event (a sporting event, movie premiere, product launch) may help the promoter in determining where to expect greater (or less) crowds, how much marketing efforts and expenses to continue (especially important for opening movies), and optimizing pricing, among other things. The scope and utility of the types of surveys is potentially huge, and the above examples of type of surveys conducted or how data received from such surveys may be used are not intended to limit such scope.

VI. DESCRIPTION OF THE FIGURES

The figures provided herein are intended to enable implementation of the invention, and not to limit the manner in which the invention may be implemented. Those skilled in the art may be able to design alternative implementations.

All interactions occur across a Global Communication Data Network which connects the user, using a computer connected to the Internet via a browser (e.g. Internet Explorer) or the user's mobile device (e.g. an iPhone, Android device, Windows phone, feature phones or any mobile device (e.g. an iPod or regular phone) capable of being connected to the Global Communication Data Network, and the Service which may reside across one or more data servers. FIG. 1 provides a possible method for registering users. Upon a user accessing the Service, the Service determines whether the user is a new user or one invited by another member (105). If a new user, the Service determines if the user is accessing the Service through a regular website, mobile website or a device application (112, 114, and 116, respectively) and checks against its database to see if the user is registered. If a user is registered, he is she is logged into the service. If not registered, the user is asked to register by entering a unique username and password; personal profile information, including demographic information (such as age, age range, gender, occupation, income range, marital status and the like); the user's social network accounts; and event preferences (e.g. if the user is a Lakers fan and would like to receive reminders of a Lakers game) (125-130). The user then submits the registration form (135) which is saved to the Service's databases (140). If the user is already using a Device Application as determined earlier (110), then registration is completed and user may log into the Service (190). If user is not using a Device Application, then user is directed to the appropriate App store for user's mobile device to download and install the appropriate Device Application (150-155). After downloading the Device Application, the user again goes through steps 110-120 and is then able to login to the Service (190).

If the new user is invited by another member to join a group within the Service, the invited user clicks on a link (sent by email, SMS or other method from the inviting user to the new invited user), enabling the Service to recognize such member as an invited user and registering information about the group and inviting member from such link (160). The invited user then registers, enters the same type of information as a new user and submits the information to the Service (165-180). The Service then provides a link for the invited user to access the App store and download the appropriate Device Application in the manner as it did for the new user (150-155).

Figure 2:
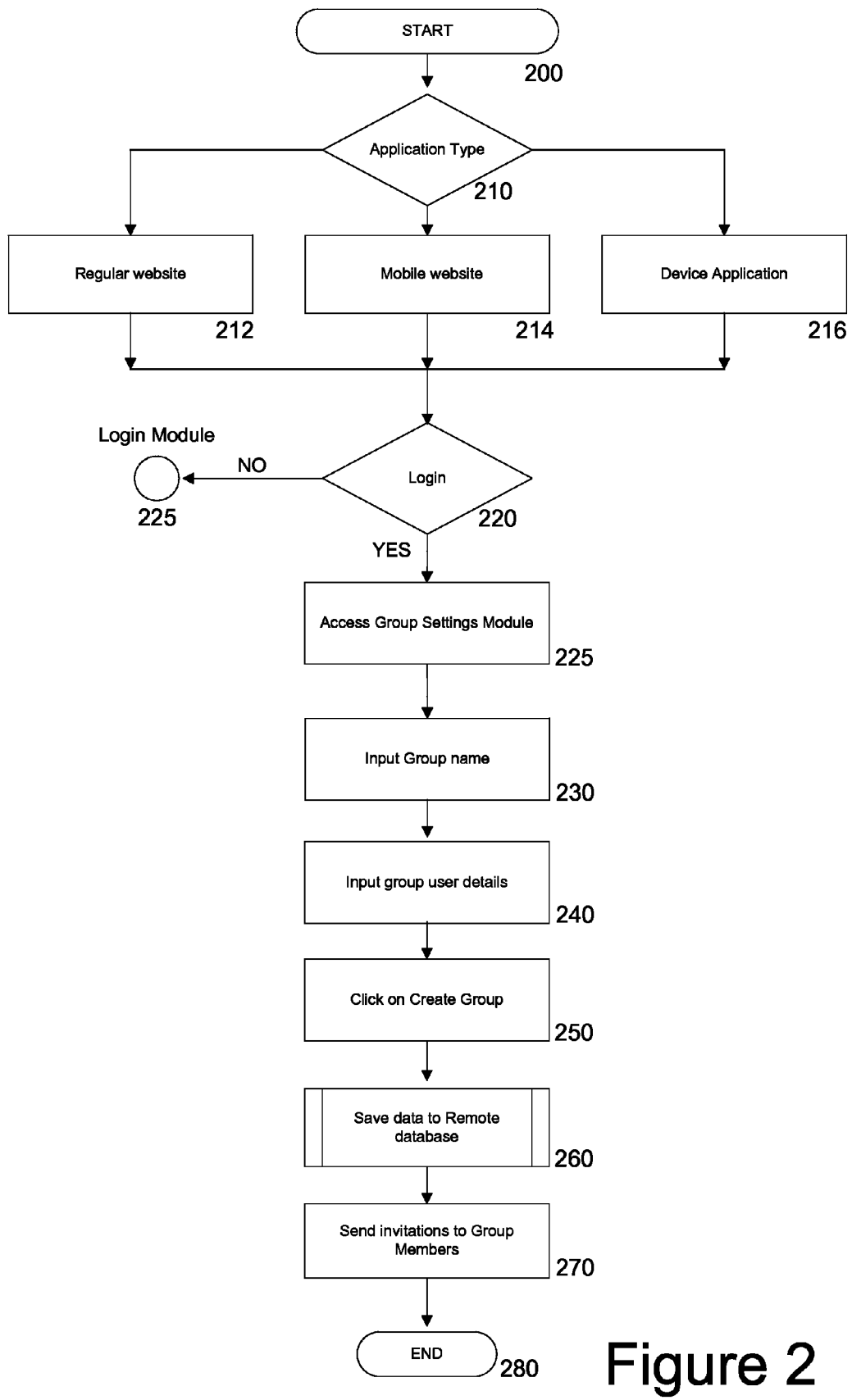
FIG. 2 shows a flowchart which provides a method for how a user may create the user's own groups to use the Service.

Once a user joins the Service, the user may decide to create the user's own groups within which to exchange polls. FIG. 2 provides such a mechanism. Upon the user accessing the Service, the Service initially determines how the user is accessing the Service (by type of website or Device Application) and then determines whether the user is properly logged into the Service (200-220). If the user is logged on, the user may access the group module (225), input the Group name (230), invitee details (such as names, email addresses, phone numbers) (240) and create the Group (250). The new Group information is stored in the Service's database servers (260) and invitations (whether by email, text messages, push notifications or as otherwise preferred by the invitees) are sent to the invitees.

Figure 3:
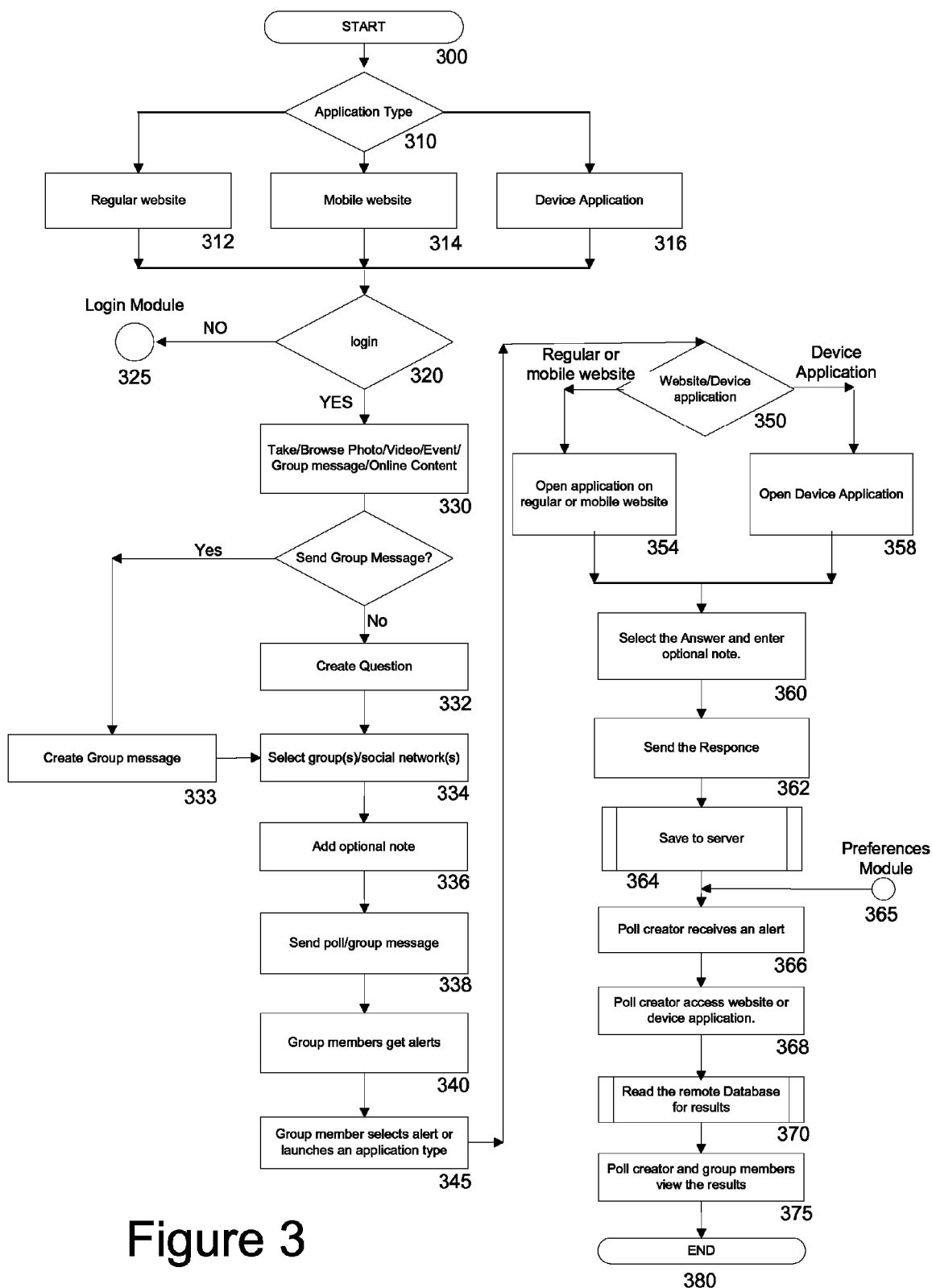
FIG. 3 shows a flowchart which provides a method for how a user may send out a poll in connection with the Service.

After a user is a member of a group, associated one or more of the user's social networks or has registered and consented to sending public polls, the user may send out a poll as described in FIG. 3. Upon the user accessing the Service, the Service initially determines how the user is accessing the Service (by type of website or Device Application) and then determines whether the user is properly logged into the Service (300-320). If the user is logged on, the user is able to select a photo, video (either previously taken and stored or just taken with the Device's camera), event and/or Online Content, create a question, select one or more private groups, social networks, or the public, add an optional note and send the poll (332-338). Alternatively the user may create only a group message and send it to one or more private groups, social networks, or the public (333-338). The other group members receive alerts (e.g. email, text message, push notification and the like depending on their preferences), launch an application (or their mobile or computer devices), answer the poll, write an optional note and submit their response (340-362). The response is saved to the Service's servers, which then send an alert to the poll creator, who then may access the servers and, along with other group members, review the poll results (364-380).

Figure 4:
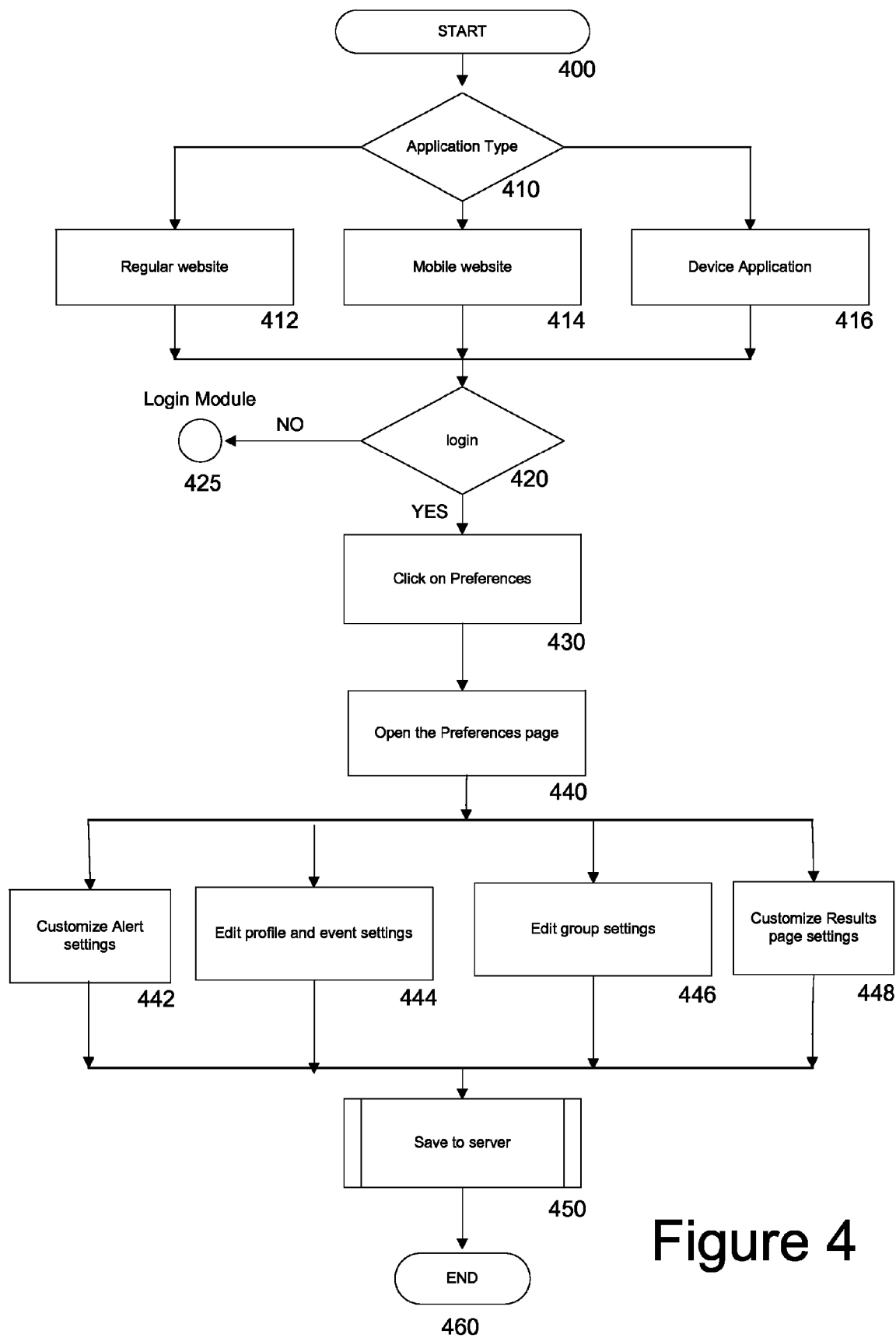
FIG. 4 shows a flowchart which provides a method for how a user may access and edit their preferences for the Service.

Users may access a separate preferences module on the Service to customize their preference settings. Such a mechanism is shown in FIG. 4. Upon the user accessing the Service, the Service initially determines how the user is accessing the Service (by type of website or Device Application) and then determines whether the user is properly logged into the Service (400-420). The user may then select a preferences menu and review, add or modify the user's preferences as to how to receive alerts, profile information (including demographic information), event settings (add or change subscriptions to event-types), group settings (create new groups, modify current groups, delete groups, add new members, change name of a group or a group's profile, such as group photo) and results settings (430-448). The additions or changes are then stored in the Service's servers (450). Those skilled in the art will know of additional commonly used preference settings for users. Hence the above is not intended as a limitation on what the settings will be for the Service, but an indication of the type of settings that may be useful to a user.

Figure 5:
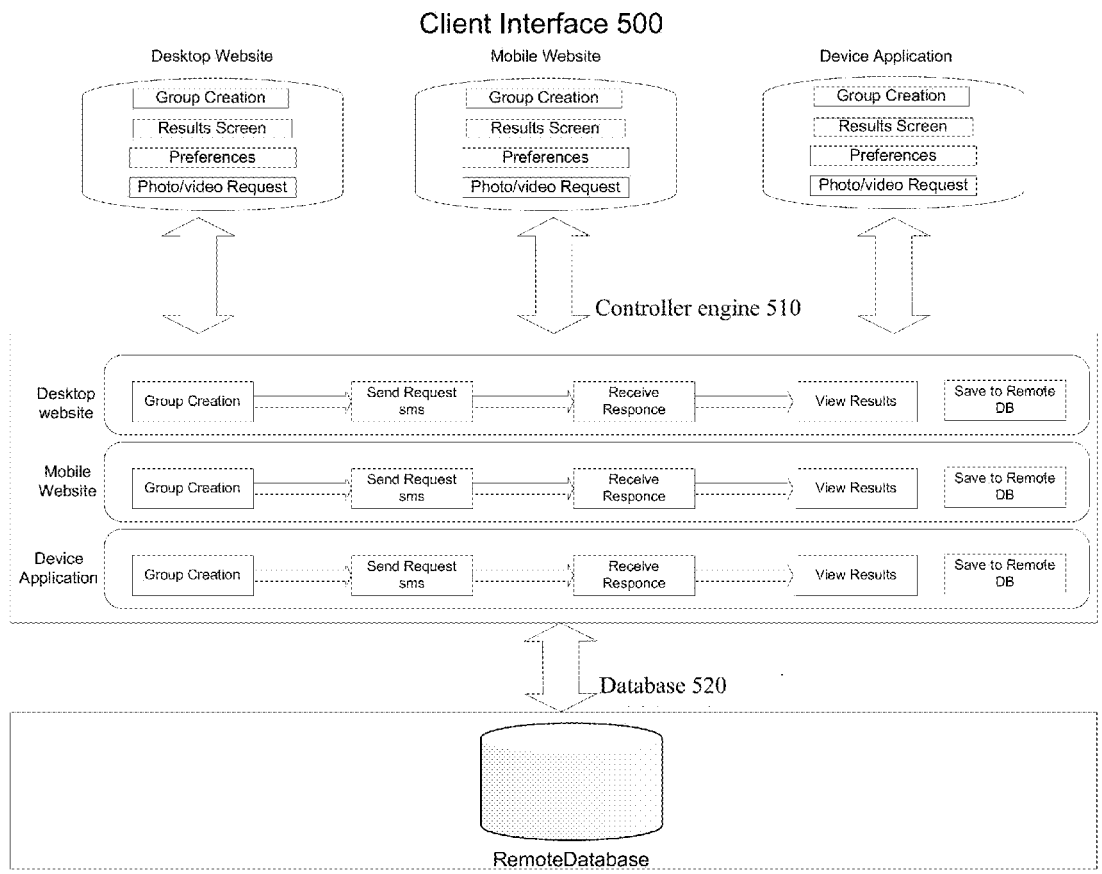
FIG. 5 shows an exemplary system for generating consumer data according to one aspect of the present invention.

FIG. 5 is a schematic diagram of an exemplary system for generating consumer data according to one aspect of the present invention. It should be appreciated by one skilled in the art that the illustrative embodiment shown in FIG. 5 is one suitable computing environment for the present invention and the method described herein may be implemented in any computing environment.

Any number of users may access the system using a client interface 500. The client interface 500 is the portal of communication between the client device (a mobile phone, computer or other device connected to the Global Data Communications Network) and the host server. On the client side, the client interface 500 is basically a mobile or regular website or device application that is executable on the client device. The client interface 500 provides the users with the ability to engage in the various polling-related transactions (such as the polling, responding and group creating features described herein).

The host server, which may also be a personal computer or set of servers, is configured to execute computer programs for carrying out the methods relating to the various polling related transactions. The host server may comprise a controller engine 510 which is responsible for receiving transaction requests from a client device and communicating the requests, as necessary, for execution by the host server. The controller engine 510 is responsible for return communication with a client device with regard to status or execution of a polling related transaction.

The host server also comprises a database 520 which stores all data that is kept by the system. The database may be a standard SQL or other database and is in communication with the controller engine 510 and provides access to data in response to requests received from a client device.

Apparatus that may be used to perform the above tasks include computers with memory and processors driven by software configured to perform those tasks and access to online communication networks such as the Internet. The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of generating consumer data by facilitating the communication of feedback in a group setting over a global data communications network, the method comprising the steps of:
   enabling at least one initial user to register using a device connected to said global data communications network;
   enabling said initial user to use said device to invite other users to create a group of users, comprising of initial user and invited users;
   enabling at least one of said invited other users to register as a group user using a device connected to said global data communications network;
   enabling at least one of said group of users to receive an event message using said group user's device connected to said global data communications network;
   enabling at least one of said group of users to send at least one poll based on said event message to said group of users using said group user's device connected to said global data communications network;
   collecting at least one response to said poll from one or more users in said group; and
   generating predictive analytical results from one or more responses.

2. The method of claim 1, wherein the poll sent to said group of users is received by said group of users using an instant alert notification method.

3. The method of claim 1, wherein the poll is sent to multiple different groups of users.

4. The method of claim 1, wherein a user provides a unique username and password that is stored in said user's account.

5. The method of claim 1, wherein a user provides demographic data that is stored in said user's account.

6. The method of claim 1, wherein the initial user is an invited other user for a different group of users.

7. The method of claim 1, wherein the user creating a poll additionally sends such poll to at least one of said user's social networks, at least one of said user's contacts from at least one of said user's social networks responds to such poll, and such response is stored.

8. The method of claim 1, wherein said poll consists of at least one question.

9. The method of claim 1, wherein said poll comprises a series of single polls, each single poll consisting of one or more of the following: a question, an image, a video or an event.

10. The method of claim 1, wherein the predictive analytical results are further based upon additional data comprising the current poll results, past polls results, past responses of one or more users, current or past notes created by one or more users of one or more groups, demographic data of users and geo-location of users.

11. The method of claim 8, wherein said poll further consists of at least one of the following: an image, a video or a note created by the user creating the poll.

12. The method of claim 10, wherein the predictive analytical results are further based on media advertising data of one or more of the users.

13. The method of claim 10, wherein the predictive analytical results are further based on the responses received from the social network contacts of at least one user.

14. The method of claim 13, wherein the predictive analytical results are further based on media advertising data of one or more of the users.

15. The method of claim 1, wherein the results of said poll are displayed on at least one of a user's device or a user's social network.

16. The method of claim 1, wherein the at least one poll based on said event message is automatically sent to said group of users.

* * * * *